UNITED STATES PATENT OFFICE.

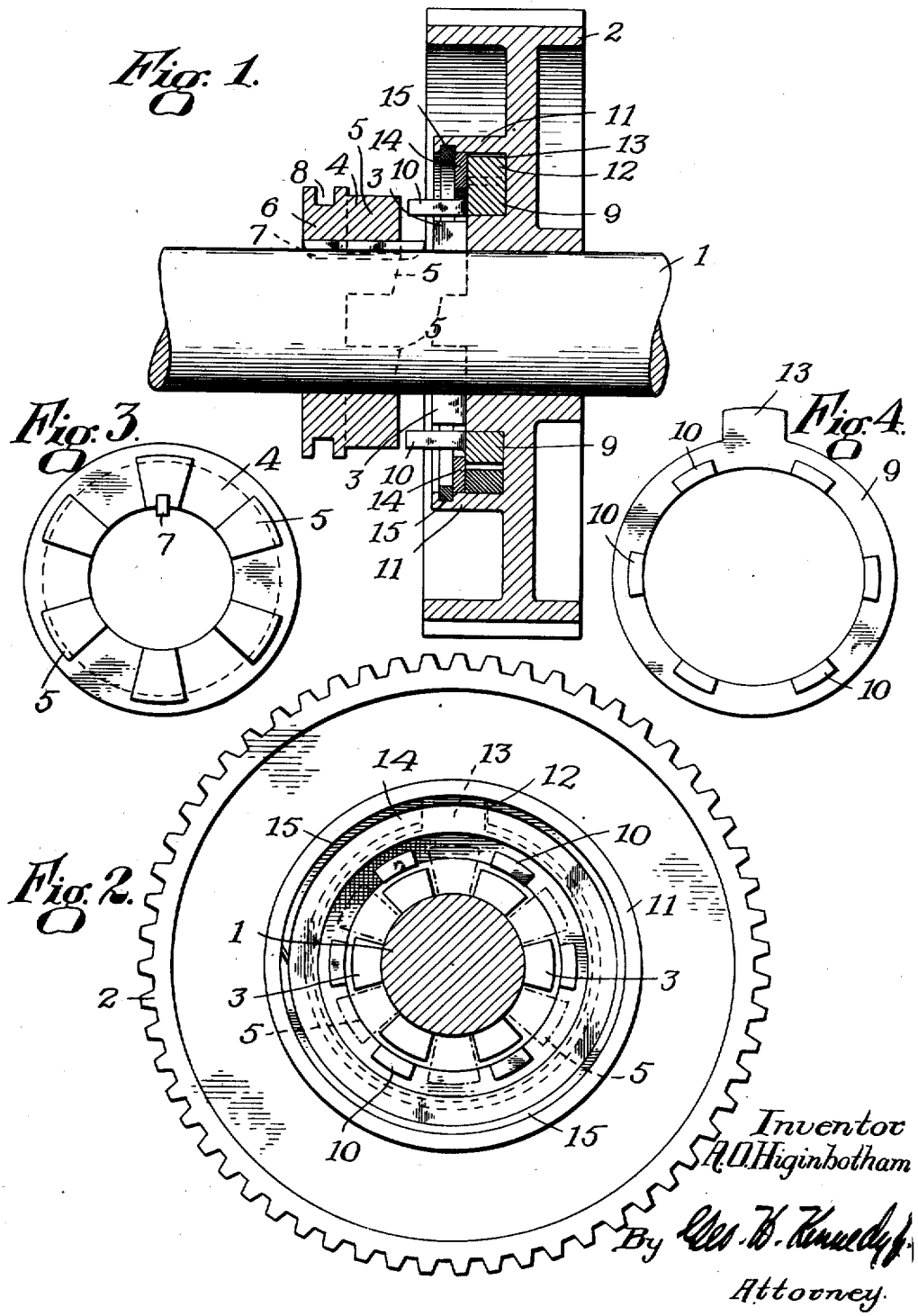

ARTHUR O. HIGINBOTHAM, OF WORCESTER, MASSACHUSETTS, ASSIGNOR TO CHARLES B. FOSTER AND COMPANY, OF WORCESTER, MASSACHUSETTS, A COPARTNERSHIP CONSISTING OF CHARLES B. FOSTER, ARTHUR O. HIGINBOTHAM, AND JEROME R. GEORGE.

CLUTCHING MECHANISM.

1,281,368.  Specification of Letters Patent.  Patented Oct. 15, 1918.

Application filed February 8, 1917. Serial No. 147,474.

*To all whom it may concern:*

Be it known that I, ARTHUR O. HIGINBOTHAM, a citizen of the United States, residing at Worcester, in the county of Worcester and Commonwealth of Massachusetts, have invented a new and useful Improvement in Clutching Mechanism, of which the following, together with the accompanying drawings, is a specification.

The present invention relates to clutching mechanism, and particularly to such mechanism as applied to power transmission apparatus involving the connection, when desired, of a gear, wheel or pulley, to a shaft on which said member may be journaled. The invention resides in the provision of means for accomplishing such connection, during the operation of the mechanism, with the minimum amount of shock imparted to the operating parts, even when one part is rotating at high speed, and the other part, to be connected to the first part, is in a state of rest. Such a condition frequently arises in connection with the, change speed power transmission mechanisms employed on motor vehicles, in the act of changing from one speed ratio to another by rendering operative the different gears on a rotating shaft; for purposes of illustration, in the accompanying drawings I have shown my invention as applied to such a gear and shaft, as will be hereinafter described with reference to said drawings, in which—

Figure 1 is a side view, partly in section, illustrating the invention.

Fig. 2 is an end view of the parts shown in Fig. 1, and

Figs. 3 and 4 are end views of separate parts of my mechanism.

Like reference characters refer to like parts in the different figures.

Referring to the drawings, there is shown a shaft 1, and a gear 2 loosely journaled thereon, the shaft in this instance being a rotating member whose rotation is to be transmitted, when desired, to the gear; obviously, the relation of these parts may be reversed by making the gear the driving member and the shaft the driven member. For the rotative connection and disconnection of parts of this character, it is common practice to provide a series of clutch teeth 3 on the hub of the gear, the same affording alternate projections and recesses for interlocking engagement with corresponding recesses and projections 4, 5 on a siding collar 6, which is keyed at 7 to the shaft 1 for rotation in unison therewith. The collar 6 is operable, by a shifting mechanism, not shown, which engages the usual annular groove 8 therein, to be moved axially of the rotating shaft, thereby, when desired, affecting the interengagement of its teeth 5 with the teeth 3 of the gear and thus causing the gear to rotate in unison with the shaft. Such engagement, however, when one of the parts is at rest and the other rotating at high speed, or even when the parts are rotating in the same direction at different speeds, is necessarily accompanied by considerable shock to both the driving and the driven members, and usually it is difficult to avoid clashing and grinding of the teeth 3 and 5 in the act of effecting the positive locking engagement between the gear 2 and collar 6.

The present invention contemplates the elimination of the foregoing disadvantages in mechanism of this class, by a construction designed, by frictional non-positive engagement, to cause the driven part to be rotated at substantially the speed of the driving part, before the positive locking engagement between said parts is effected. To this end the hub of gear 2 has loosely journaled thereon a ring 9, on the face of which are formed teeth 10 of substantially the same size and arrangement as the integral teeth 3; said teeth 10 project a suitable distance beyond teeth 3 when the ring 9 is in place, as shown in Fig. 1, so as to be engaged by the teeth 5 of collar 6 before teeth 3 are so engaged. Encircling the ring 9, and disposed within a rim or flange 11 of gear 2 is a split expanding resilient ring 12. Between the free ends of ring 12 projects a lug 13, attached to or formed integral with the ring 9, and having a sufficient clearance to rotate freely within the rim or flange 11. The two rings 9 and 12 are retained in the position shown in Fig. 1 by any suitable means, such as an annular retaining plate 14 bearing against their outer faces and held in position by an expanding ring 15, which is seated in a groove in the inner periphery of flange or rim 11.

The operation of my improved clutching mechanism is such that when the slidable collar 6, rotating with shaft 1, is moved to the right in Fig. 1, its toothed surface will first engage the teeth 10 of ring 9, the latter being a relatively light part, having no appreciable inertia and presenting no resistance to rotation, since, unlike the gear 2, not connected in any way to any power transmission mechanism. The resultant rotation of ring 9 carries the lug 13 against one of the free ends of the split ring 12 and thereby further tends to expand said ring 12 into even closer frictional contact with the inner periphery of flange 11, thus exerting a frictional rotative force on gear 2 before any positive interlocking engagement between said gear and the collar 6 is effected. With the inertia of gear 2 thus overcome, and with said gear rotating in the same direction at approximately the same speed as collar 6, it is a very easy matter to complete the right hand movement of said collar to cause its positive engagement with the teeth 3 and thereby to transmit the full rotative force of shaft 1 through gear 2.

I claim,

1. In combination, a shiftable driving member having clutching teeth, a driven member having opposing clutching teeth for engagement with the teeth of the driving member to effect the positive rotation of the driven member, a rotatable ring held in the driven member having teeth projecting beyond said teeth of the driven member for engagement with the teeth of the driving member, prior to the engagement of the teeth of the driving member with the teeth of the driven member, and means operatively connected with said ring to frictionally impart its rotation to the driven member.

2. The combination with a driving member, of a driven member having a toothed clutching surface, a toothed collar splined on said driving member, and movable into engagement with the toothed clutching surface of said driven member, to cause rotation of said members in unison, and a toothed ring rotatable with respect to said driven member, and in position to be engaged by the initial axial movement of said collar, and means for frictionally transmitting the rotation of said toothed ring to the driven member.

3. The combination with a driving member, of a driven member having a toothed clutching surface, a toothed collar splined on said driving member, and movable into engagement with the toothed clutching surface of said driven member, to cause rotation of said members in unison, and a toothed ring rotatable with respect to said driven member, and in position to be engaged by the initial axial movement of said collar, and means for frictionally transmitting the rotation of said toothed ring, by friction, to said driven member.

4. The combination with a driving member, of a driven member having a toothed clutching surface, a toothed collar splined on said driving member, and movable into engagement with the toothed clutching surface of said driven member, to cause rotation of said members in unions, and a toothed ring rotatable with respect to said driven member, and in position to be engaged by the initial axial movement of said collar, and a member expansible by the rotation of said ring into frictional driving engagement with said driven member.

Dated this 29th day of January, 1917.

ARTHUR O. HIGINBOTHAM.

Witnesses:
NELLIE WHALEN,
PENELOPE COMBERBACH.

It is hereby certified that in Letters Patent No. 1,281,368, granted October 15, 1918, upon the application of Arthur O. Higinbotham, of Worcester, Massachusetts, for an improvement in "Clutching Mechanism," errors appear in the printed specification requiring correction as follows: Page 1, line 56, for the word "siding" read *sliding;* page 2, line 78, claim 4, for the word "unions" read *unison;* and that the said Letters Patent should be read with these corrections therein that the same may conform to the record of the case in the Patent Office.

Signed and sealed this 19th day of November, A. D., 1918.

[SEAL.]

R. F. WHITEHEAD,

*Acting Commissioner of Patents.*

Cl. 192—4.